US011811107B2

(12) United States Patent
Piesker et al.

(10) Patent No.: US 11,811,107 B2
(45) Date of Patent: Nov. 7, 2023

(54) USE OF A HEAT SOURCE FOR GENERATION OF ELECTRICITY AND AIRCRAFT COMPRISING A COOLING SYSTEM

(71) Applicants: Airbus Operations GmbH, Hamburg (DE); Airbus Defence and Space GmbH, Taufkirchen (DE)

(72) Inventors: Markus Piesker, Hamburg (DE); Winfried Lohmiller, Taufkirchen (DE)

(73) Assignees: Airbus Operations GmbH, Hamburg (DE); Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 17/550,901

(22) Filed: Dec. 14, 2021

(65) Prior Publication Data

US 2022/0238895 A1 Jul. 28, 2022

(30) Foreign Application Priority Data

Jan. 28, 2021 (DE) ..................... 10 2021 101 987.7

(51) Int. Cl.
*H01M 8/04007* (2016.01)
*B60L 58/33* (2019.01)
(Continued)

(52) U.S. Cl.
CPC ......... *H01M 8/04059* (2013.01); *B60L 58/33* (2019.02); *B64D 27/24* (2013.01);
(Continued)

(58) Field of Classification Search
CPC ......... H01M 8/04029; H01M 8/04059; H01M 8/04074; B60L 58/33; B60L 2200/10; B64D 27/24
See application file for complete search history.

(56) References Cited

U.S. PATENT DOCUMENTS 3,603,087 A * 9/1971 Burkland .............. F01K 25/065
60/671
7,992,400 B2 8/2011 Uno et al.
(Continued)

FOREIGN PATENT DOCUMENTS

DE 102005051428 A1 6/2006
EP 3054519 * 8/2016
(Continued)

OTHER PUBLICATIONS

English translation of JP Publication 2000-274210, dated Oct. 2000.*
(Continued)

*Primary Examiner* — Brittany L Raymond
(74) *Attorney, Agent, or Firm* — Greer, Burns & Crain, Ltd.

(57) ABSTRACT

A cooling system containing a two-phase refrigerant that comprises a condenser, an evaporator and a conveying device. The evaporator is integrated in a heat source or thermally coupled thereto. Gaseous refrigerant from the evaporator is expanded in an expander, converted into mechanical energy and used to drive a generator for generation of electricity. Furthermore, an aircraft comprising a cooling system, wherein an electrical drive is supplied with electricity from a fuel cell, cooled using the cooling system, and the generator of the cooling system.

13 Claims, 7 Drawing Sheets

(51) Int. Cl.
  *B64D 27/24* (2006.01)
  *H01M 8/04029* (2016.01)
(52) U.S. Cl.
  CPC ... *H01M 8/04029* (2013.01); *H01M 8/04074* (2013.01); *B60L 2200/10* (2013.01); *H01M 2250/20* (2013.01)

(56) References Cited

U.S. PATENT DOCUMENTS

| | | |
|---|---|---|
| 2003/0150403 A1 | 8/2003 | Bharathan et al. |
| 2010/0146949 A1 | 6/2010 | Stobart et al. |
| 2012/0036854 A1 | 2/2012 | Vaisman et al. |
| 2019/0128570 A1 | 5/2019 | Moxon |
| 2020/0149790 A1 | 5/2020 | Choi |

FOREIGN PATENT DOCUMENTS

| | | | |
|---|---|---|---|
| JP | H10205308 A | | 8/1998 |
| JP | 2000-274210 | * | 10/2000 |
| JP | 200516897 A | | 1/2005 |
| JP | 2019-090387 | * | 6/2019 |
| KR | 2014-0054252 | * | 5/2014 |
| WO | 2007000811 A1 | | 1/2007 |

OTHER PUBLICATIONS

English translation of KR Publication 2014-0054252, dated May 2014.*
English translation of JP Publication 2019-090387, dated Jun. 2019.*
German Search Report; priority document.

* cited by examiner

USE OF A HEAT SOURCE FOR GENERATION OF ELECTRICITY AND AIRCRAFT COMPRISING A COOLING SYSTEM

CROSS-REFERENCES TO RELATED APPLICATIONS

This application claims the benefit of the German patent application No. 10 2021 101 987.7 filed on Jan. 28, 2021, the entire disclosures of which are incorporated herein by way of reference.

FIELD OF THE INVENTION

The invention relates to a cooling system for a two-phase refrigerant with integrated generation of electricity and to an aircraft comprising such a cooling system. In particular, the invention relates to a cooling system for a heat source comprising an expander which uses gaseous refrigerant from an evaporator in order to drive a generator and to an aircraft comprising such a cooling system.

BACKGROUND OF THE INVENTION

In the description which follows and the attached claims, a "two-phase refrigerant" refers to a medium (fluid) which changes its state of matter in the case of cold transfer or heat transfer. Generally, gaseous refrigerant is cooled in a condenser and thereby changes into the liquid state. As a result of heat exchange with an object or medium to be cooled, the liquid refrigerant can vaporize and can cool the object or medium to be cooled by withdrawing therefrom the energy required for vaporization of the refrigerant (enthalpy of vaporization).

In aircraft, fuel cells are increasingly being used for providing electricity in the aircraft. Especially in aircraft flying at an altitude between 15 km and 25 km, such as a pseudo-satellite (high-altitude pseudo-satellite—HAPS) for example, electricity is used for propulsion of the aircraft. This is produced during the day by solar cells and used for propulsion, and remaining energy is stored chemically. For example, the electricity generated is used in an electrolyzer for splitting water. In order to be able to propel the aircraft at night as well, the chemically stored energy is converted into electrical energy in a fuel cell. For example, the fuel cell can generate water and electricity through the reaction from hydrogen and oxygen, stored separately. The combination of this alternating storage of electricity and generation of electricity is also referred to as a regenerative fuel-cell system.

Since these highflying aircraft are designed to fly for several days, weeks or even months, a lowest possible weight is important.

Furthermore, in such aircraft and also in other apparatuses, heat-generating components are present that must be cooled during operation. However, this excess heat is often only released to the environment.

SUMMARY OF THE INVENTION

It is therefore an object of the invention to provide a cooling system, and an associated aircraft, which works in an energy-efficient manner, yet has a low weight.

According to a first aspect for better understanding of the present disclosure, a cooling system containing a two-phase refrigerant comprises a condenser which is configured to cool the two-phase refrigerant and to convert gaseous refrigerant into liquid refrigerant and an evaporator which is integrated in a heat source or thermally coupled thereto and is configured to heat the two-phase refrigerant, wherein at least some of the refrigerant vaporizes to form gaseous refrigerant. The cooling system furthermore comprises a conveying device which is configured to convey the two-phase refrigerant from the condenser to the evaporator.

Waste heat of the heat source is therefore absorbed by the refrigerant and taken away by the cooling system. In other words, heat exchange with the device to be cooled (part or other component) or a medium heated by the heat source takes place in the evaporator, and it is especially the enthalpy of vaporization of the refrigerant that serves for absorption of heat energy into the refrigerant.

In the present disclosure, a liquid heat transfer fluid is preferably dispensed with for weight reduction of the cooling system. Therefore, a two-phase refrigerant is used, at least some of the refrigerant changing into the gaseous state in the evaporator. As a result, the cooling system is altogether lighter compared to a system containing solely liquid heat transfer fluid. For example, the cooling system has to be designed for solely liquid refrigerant only in a region between condenser outlet and evaporator inlet, whereas other sections of the cooling system are designed for gaseous refrigerant. Compared to conventional cooling circuits with purely liquid operation, the weight of the liquid refrigerant is not applicable in the region of gaseous refrigerant, and refrigerant lines can be smaller and thus lighter in the region of liquid refrigerant, since altogether less liquid refrigerant is required.

The condenser can be thermally coupled to a heat sink; for example, what can flow through the condenser is a cold fluid (gas or liquid) which absorbs heat and cools the refrigerant in the condenser and, in doing so, converts gaseous refrigerant into the liquid state.

The cooling system moreover comprises a generator which is configured to generate electricity and an expander which is fluidically connected to the evaporator downstream of the evaporator and is configured to expand the gaseous refrigerant from the evaporator, to obtain mechanical energy and to drive the generator. The cooling system thus makes it possible to recover energy from the waste heat of the heat source that would otherwise be released to the heat sink of the condenser. Heat energy can be converted into electricity by the expander and generator and used energetically, especially when the heat energy is withdrawn from the heat source by means of the enthalpy of vaporization of the refrigerant.

The expander can, for example, be a turbine which is driven by the gaseous refrigerant. In the cooling system, the gaseous refrigerant is present under a higher pressure than the liquid refrigerant, especially the liquid refrigerant downstream of the condenser. This higher pressure can be used to drive the turbine and thus to recover energy in the form of electricity.

In one configuration variant, the cooling system can furthermore comprise a fuel cell, wherein the evaporator is integrated in the fuel cell or thermally coupled to the fuel cell. The waste heat of the fuel cell can therefore be used by the expander and generator to recover energy. In particular, more electricity can be generated than by the fuel cell alone.

The fuel call can be a reversible fuel cell, i.e., a fuel cell which can both generate electricity and use electricity for chemical storage (electrolysis). Alternatively or additionally, the fuel cell can also be an electrolyzer. Therefore, the fuel-cell cooling system is not restricted to a fuel cell for generation of electricity, but can also be used only for an electrolyzer. Likewise alternatively or additionally, the cooling system can cool a fuel cell and a separately arranged electrolyzer. Here, for example, the fuel cell and the electrolyzer can each constitute an evaporator which is supplied with refrigerant from the conveying device as desired, or the fuel cell and the electrolyzer can have a common thermal coupling to the evaporator.

For example, in the case of use in an electrically powered aircraft, additional electricity can therefore be obtained. This concerns phases in which electricity is generated by means of a fuel cell, but also phases in which electricity is generated via other means (e.g., solar cells) and is chemically stored by means of an electrolyzer.

Alternatively or additionally, the heat source can be any device or component of an apparatus which produces waste heat. For example, electrical parts can generate waste heat and can constitute a heat source. Furthermore, the evaporator can be thermally coupled to a battery, an electronic component, an electric motor and/or a drive or integrated therein, and they can likewise be cooled by the cooling system described. In addition, a combustion engine, a gas turbine or a similar apparatus having a high waste heat load, and also the waste gases thereof, etc., can be cooled using the cooling system, with energy being recovered by the expander and generator. The waste heat of this device/component alone or in combination with the waste heat of a fuel cell and/or an electrolyzer can be used for additional generation of electricity by the expander and generator.

In one configuration variant, the cooling system can furthermore comprise a first collection vessel which is configured to collect the liquid and gaseous refrigerant from the evaporator, and a first discharge line. The collection vessel can, for example, be fluidically connected to the evaporator just after the evaporator (comprise a short cooling-system line) or be integrated in the evaporator. Alternatively, a cooling-system line can also have, downstream of the evaporator, a widening which serves as a collection vessel. The first collection vessel serves for separation of gaseous and liquid refrigerant which leaves the evaporator.

The first discharge line can be configured to discharge the gaseous refrigerant from the first collection vessel. In particular, the first discharge line can fluidically connect the first collection vessel to the expander. For example, the first discharge line can be connected to the collection vessel in an upper region thereof for separation and discharge of the upwardly flowing gaseous refrigerant from the liquid refrigerant by means of gravity.

Since only gaseous refrigerant is supplied to the expander, the expander can have a relatively simple construction, since it need not be designed for refrigerants in droplet form (partially liquid). Therefore, the energy recovery system can be implemented very easily.

In a further configuration variant, the cooling system can furthermore comprise a first regulating valve which is configured to regulate a flow rate of the gaseous refrigerant through the first discharge line. In particular, the control system can be configured to control the first regulating valve in such a way that the gaseous refrigerant supplied to the expander is superheated. In this connection, the first regulating valve establishes and maintains a pressure of the gaseous refrigerant in the first discharge line (downstream of the first regulating valve) that prevents condensation of the gaseous refrigerant. In particular, the pressure of the gaseous refrigerant in the first discharge line is reduced compared to a pressure upstream of the first regulating valve (e.g., in the first collection vessel). This too avoids formation of droplets in the gaseous refrigerant, and the structure of the expander is simpler and thus lighter as a result.

Here, the control system is especially configured to ensure superheating of the refrigerant, but to maximize a pressure difference with respect to a section of the refrigerant downstream of the expander. The reduction of the pressure in the gaseous refrigerant for superheating should have a minimum reduction of the mechanical energy to be obtained by the expander.

Alternatively or additionally, the refrigerant in the first discharge line can also be heated by supplying heat energy. Any available heat source can be used for this purpose. For example, the refrigerant can be heated between 5 K and 15 K, preferably by 10 K, above the boiling temperature (the dew point) in order to achieve sufficient superheating of the refrigerant.

In yet a further configuration variant, the cooling system can furthermore comprise a second discharge line which fluidically connects the first collection vessel to a part of the cooling system downstream of the condenser and is configured to discharge liquid refrigerant from the first collection vessel. For example, the second discharge line can be connected to the first collection vessel in a lower section thereof for discharge of the downwardly flowing liquid refrigerant by means of gravity.

The liquid refrigerant flowing through the second discharge line does not require an additional conveying device, the resulting being that the energy recovery system can likewise be of a light design and does not require energy for such an additional conveying device. Owing to the connection between first collection vessel (directly or just after the evaporator) and the part of the cooling system downstream of the condenser, there is a pressure difference between start and end of the second discharge line. As a result of the pressure difference, the liquid refrigerant is pushed or conveyed through the second discharge line into the part of the cooling system downstream of the condenser without additional devices and/or without the aid of gravity. The pressure in the part of the cooling system downstream of the condenser is significantly determined by the cooling and condensation of the refrigerant in the condenser. Conversely to the increasing pressure in the evaporator, the pressure is lower at the outlet side of the condenser than at the inlet side thereof.

By means of the first regulating valve, the pressure in the first collection vessel can moreover especially be controlled in such a way that the pressure difference between first collection vessel and the part of the cooling system downstream of the condenser is formed and maintained.

In another configuration variant, the cooling system can furthermore comprise a supply line which fluidically connects the conveying device to the evaporator and a second regulating valve which is arranged in the supply line and is configured to regulate a flow rate of the refrigerant through the supply line. In this connection, the control system can be configured to control the second regulating valve in such a way that the evaporator is operated in a wet vaporization process. In the supply line, liquid refrigerant is conducted from the conveying device to the evaporator.

With the aid of the second regulating valve, it is then firstly possible to control the quantity of refrigerant in the evaporator that is required for taking away the heat energy arising there. Secondly, it is possible for the control system to conduct a certain excess of liquid refrigerant into the evaporator, so that a wet vaporization process takes place therein. In other words, more liquid refrigerant is conducted into the evaporator than can be vaporized by the supply of heat from the fuel cell and/or the electrolyzer. The wet vaporization process causes liquid refrigerant to be present throughout the evaporator. This allows an even cooling effect along the flow direction of the refrigerant and thus an even heat distribution within the evaporator.

For example, fuel cells and electrolyzers work most efficiently when certain operating parameters are adhered to, especially when a certain operating temperature is held. For example, the operating temperature can be between 70° C. and 90° C. or between 80° C. and 90° C.

Since these components comprise a stack of many individual cells, it is furthermore necessary to achieve an even temperature distribution within the stack, i.e., across all the cells. Owing to the wet vaporization process, what is available within the fuel cell and/or the electrolyzer at any point is liquid refrigerant which can vaporize there with absorption of heat energy. Regions having strong heat development (so-called hotspots) can therefore be avoided. It is self-evident that the same applies to any other heat source which is cooled using the cooling system.

Merely by way of example, at least 20% more liquid refrigerant can be conducted into the evaporator than is vaporized therein. In other words, in the flow direction of the refrigerant downstream of the evaporator, 20% of the (formerly liquid) refrigerant is (continues to be) in liquid form, whereas the rest of the refrigerant has changed into the gaseous state in the evaporator.

According to one configuration variant, in order to allow the relatively narrow temperature range of the operating temperature of the heat source (e.g., fuel cell/electrolyzer) in a lasting manner, the control system of the cooling system can furthermore be configured to capture operating conditions of the heat source, the fuel cell and/or the electrolyzer, to ascertain a cooling demand on the basis of the operating conditions, and to operate the cooling system in such a way that the cooling demand of the heat source, the fuel cell and/or the electrolyzer is covered.

For this purpose, the control system can, by of example, ascertain a demand for electrical energy which is to be generated by the fuel cell or is available to the electrolyzer for chemical cleavage (e.g., on the basis of connected electrical loads or electricity generation devices, such as solar cells for example). The electrical energy is in relation to the quantity of heat generated by the heat source, the fuel cell and/or the electrolyzer. It is this quantity of heat that is to be absorbed and taken away by the cooling system.

In another configuration variant, the control system can furthermore be configured to control the conveying device and/or the condenser in such a way that the temperature of the refrigerant supplied to the evaporator substantially corresponds to the temperature of the evaporator. The control system can control a delivery rate of the refrigerant through the conveying device and/or the outlet temperature of the liquid refrigerant from the condenser in order to determine the desired temperature of the refrigerant which is supplied to the evaporator.

Thus, in one configuration variant, the heat source, the fuel cell and/or the electrolyzer can have a section which forms the evaporator. This can avoid excessively strong cooling or at least sectional cooling of the heat source, the fuel cell and/or the electrolyzer. Such cooling can, for example, affect the operation of individual cells in the stack of a fuel cell or electrolyzer and/or have altogether an adverse effect on efficient operation of the heat source. By approximation (or equalization) of the temperature of the refrigerant and the evaporator, the operating temperature of the heat source, the fuel cell and/or the electrolyzer can be kept constant. Cooling of the heat source, the fuel cell and/or the electrolyzer is then effected (virtually exclusively) via the enthalpy of vaporization of the refrigerant.

Commonly, a fuel cell and an electrolyzer have channels, through which a heat transfer fluid is guided in order to cool them. According to some of the present variants, the fuel cell and/or the electrolyzer form the evaporator. For example, the refrigerant of the cooling system can flow through the heat transfer fluid channels which are already present and which therefore form the evaporator. As a result, existing fuel cells and/or electrolyzers can be used with the cooling system described here.

Alternatively or additionally, the cooling system can furthermore comprise a cooling circuit which thermally couples the heat source to the evaporator. The cooling circuit can comprise its own heat transfer fluid (fluid or other medium for transfer of heat energy). This has the advantage of optimizing the heat transfer fluid for the heat source, whereas the refrigerant in the cooling system has other properties which would have disadvantages in the heat source (e.g., electrical conductivity of the refrigerant in the case of a fuel cell, an electrolyzer or some other electrically conductive heat source).

Merely by way of example, the heat transfer fluid can be enclosed in a heat pipe which is arranged between the evaporator and the heat source. In this connection, the heat transfer fluid independently ensures heat exchange between evaporator (refrigerant of the cooling system) and the heat source. In other words, what takes place independently is the cooling circuit in the heat pipe. This allows fluidic separation of the cooling system and the heat source.

Alternatively or additionally, the cooling circuit can comprise a further conveying device which conveys a heat transfer fluid through lines of the cooling circuit and especially from the heat source to the evaporator. The additional lines of the cooling circuit mean that the heat source and evaporator of the cooling system can be spatially separate.

In another configuration variant, the cooling system can furthermore comprise a bypass line which is connected to the first regulating valve and is configured to conduct gaseous refrigerant from the first regulating valve to a part of the cooling system downstream of the expander. In this connection, the regulating valve can be designed in such a way that it supplies between 0% and 100% of the gaseous refrigerant to the expander, whereas the rest of the gaseous refrigerant (100% to 0%) is conducted through the bypass line. As a result, the output of the expander and thus of the generator can be adapted to certain load cases, for example if the total achievable electricity cannot be consumed or stored. On the other hand, in a starting phase of the cooling system, the gaseous refrigerant can also be conducted through the bypass line in order to reach the necessary operating conditions of the cooling system as rapidly as possible and not to withdraw energy from the refrigerant cycle which is building up.

In another configuration variant, the cooling system can furthermore comprise a second collection vessel which is configured to collect the liquid refrigerant from the condenser. In other words, the second collection vessel is fluidically connected to the condenser downstream thereof, so that condensed (now liquid) refrigerant in the condenser flows into the second collection vessel. The second collection vessel serves as a reservoir of liquid refrigerant for the conveying device, so that gaseous refrigerant does not reach the conveying device and, as a result, damage to the conveying device can be avoided.

For example, the second discharge line can fluidically connect the first collection vessel to the second collection vessel. The central task of the second collection vessel is to form a reservoir of liquid refrigerant for the section of the cooling system leading up to the evaporator. Therefore, liquid refrigerant which is separated from the gaseous refrigerant in the first collection vessel can be directly conducted into the second collection vessel. The second discharge line thus forms a bypass of the condenser.

In another configuration variant, the second regulating valve can be connected to a further refrigerant line which fluidically connects the second regulating valve to the second collection vessel. For example, the second regulating valve can be implemented in such a way that between 0% and 100% of refrigerant is conducted from the conveying device into the evaporator via the supply line, whereas the correspondingly remaining quantity of refrigerant (between 100% and 0%) is conducted from the conveying device into the collection vessel. As a result, the quantity of refrigerant which is supplied to the evaporator can be determined independently of the rate of change of the delivery rate of the conveying device. Moreover, the conveying device can also be operated in a more constant manner, and it is treated with care as a result. Altogether, this can reduce the total quantity of liquid refrigerant in the cooling system and optimize and reduce the size of the first and/or second collection vessel. This can further save weight.

In yet a further configuration variant, the cooling system can furthermore comprise a supercooler which is configured to supercool refrigerant downstream of the condenser and upstream of the conveying device. Supercooling of the refrigerant prevents cavitation in the conveying device, since the refrigerant has been cooled further below its boiling point. For example, the supercooler can reduce the temperature of the refrigerant leaving the condenser by 2 to 10 K, preferably by 5 K, (below the outlet temperature at the condenser or below the boiling point).

Furthermore, the supercooler can be integrated in the condenser, form part of the condenser or be a section of the condenser. As a result, the condenser and the supercooler can share a heat sink (e.g., a cold fluid, cold air stream, etc.). Alternatively, the supercooler can also be implemented separately from the condenser and have its own heat sink.

In a further configuration variant, the cooling system can comprise at least one pressure sensor and/or temperature sensor which measures the pressure and/or the temperature of the refrigerant at a relevant position in the cooling system. The control system can access the signals or data of the at least one sensor in order to control the conveying device, the first regulating valve and/or the second regulating valve.

Merely by way of example, the at least one sensor can be arranged in the first collection vessel and/or in the second collection vessel. As a result, the pressure and/or the temperature downstream of the evaporator and/or downstream of the condenser can be determined. Furthermore, fuel cells or electrolyzers are already equipped with such sensors, which can be coupled to the control system in order to determine the pressure and/or the temperature of the refrigerant in the evaporator.

In the case of a known volume of the first and/or second collection vessel (or of the entire cooling system), the control system can determine the volume of the liquid and/or gaseous refrigerant on the basis of the sensor signals or data and taking into account the laws of thermodynamics Especially in the case of constant operation of the cooling system and thus a substantially homogeneous temperature distribution of the refrigerant within the cooling system, the entire (liquid) quantity of refrigerant can be calculated. As a result, the control system can also be configured to detect a leak or a loss of refrigerant.

Alternatively or additionally, fill-level sensors can also be provided in the first and/or the second collection vessel in order to determine the quantity of liquid refrigerant.

Furthermore, the control system can control the cooling system (or its components) in such a way that the pressure in the cooling system downstream of the evaporator is about 3.2 bar and that downstream of the condenser is 2.4 bar. The pressure difference between 3.2 and 2.4 bar is normally sufficient for conveying the liquid refrigerant from the first collection vessel to the section of the cooling system downstream of the condenser. Furthermore, the pressure difference, which is also present between the first collection vessel and a section of the cooling system upstream of the condenser, is sufficient for converting the refrigerant after exit from the evaporator, where it is a saturated vapor, into superheated vapor (e.g., with the aid of the first regulating valve).

In one configuration variant, the refrigerant can be R1336mzz(Z), R134a, methanol or CO2 (carbon dioxide). It is self-evident that any other two-phase refrigerant can be used. However, R1336mzz(Z) is especially suitable in a cooling system having a fuel cell or electrolyzer as the heat source, the fuel cell or electrolyzer being optimally operated at a temperature of approx. 85° C., since R1336mzz(Z) vaporizes at a pressure between 2.4 and 3.2 bar and a temperature between 70° C. and 90° C. This can achieve optimal cooling of the fuel cell or the electrolyzer at optimal operating temperature. In addition, R1336mzz(Z) is electrically nonconductive, meaning that it can be directly introduced into the fuel cell or the electrolyzer.

In a further configuration variant, the condenser can be operated in such a way (be cooled by the heat sink in such a way) that the pressure difference in relation to the pressure of the refrigerant in the first collection vessel is sufficient for conveying the gaseous and the liquid refrigerant to the condenser and/or to the section of the cooling system downstream of the condenser and/or for superheating the gaseous refrigerant. Thus, a flow rate of the cooling medium of the heat sink can be controlled in such a way that a desired condenser temperature and thus temperature profile of the refrigerant from the inlet to the outlet of the condenser is achieved.

In yet a further configuration variant, the cooling system can comprise a third regulating valve which is arranged in the second discharge line and is configured to regulate a flow rate of the liquid refrigerant through the second discharge line. The third regulating valve allows not only the regulation of the flow rate (e.g., by the control system), but also regulation of the pressure in the first collection vessel. Especially in the starting phase of the cooling system, a higher pressure in the evaporator and in the cooling system on the outlet side of the evaporator can be built up as a result.

In another configuration variant, the first discharge line or at least a section thereof can be designed as a double-wall pipe. In this connection, an inner pipe of the first discharge line can guide liquid refrigerant, for example refrigerant from the conveying device. For example, the inner pipe of the first discharge line can form the supply line from the conveying device to the evaporator. In the outer pipe of the first discharge line, gaseous refrigerant can be guided from the evaporator or the first collection vessel to the condenser, i.e., can form the first discharge line. As a result, the gaseous refrigerant in the first discharge line is heated by the liquid refrigerant, thereby preventing condensation in the first discharge line.

In yet a further configuration variant, at least a section of the first discharge line can have a fixed flow resistance which is predetermined such that the refrigerant in the first collection vessel has a higher pressure than the refrigerant in the part of the cooling system downstream of the condenser. In other words, instead of or in addition to the first regulating valve, the flow rate of the gaseous refrigerant from the first collection vessel to the condenser is restricted by the first discharge line itself, so that pressure builds up in the first collection vessel. Owing to the pressure difference now present between the first collection vessel and the outlet side of the condenser, the liquid refrigerant can be conveyed from the first collection vessel to the outlet side of the condenser without additional devices and/or without the aid of gravity.

For example, the first discharge line can have a section which has a smaller diameter than other lines of the cooling system, certain flow-impeding fittings and/or a short narrowing of the flow cross section in the flow direction. This can save weight, especially since a first regulating valve is not necessary. Moreover, control complexity can be reduced. The pressure difference between first collection vessel and outlet side of the condenser can, in this case, be exclusively controlled via the conveying device and the conveyed quantity of refrigerant in the evaporator. Especially in cooling systems having low control complexity, for example in the case of even heat generation by the heat source to be cooled using the evaporator, constant operation of the cooling system is possible even without a first regulating valve.

According to a further aspect for better understanding of the present disclosure, an aircraft can comprise an electrical drive and a cooling system according to the first aspect (or one of its configuration variants and/or examples). The electrical drive can, for example, be an electrically powered engine or a motor with a propeller. In particular, the generator driven by the expander and possibly the fuel cell of the cooling system can supply the electrical drive with electricity. As a result, the size of the fuel cell and thus its weight can be reduced.

Alternatively or additionally, the electricity generated by the generator can also be used to supply other electrical components in the aircraft. As a result, a fuel cell, battery or other power supply can be optimized in terms of its size (and thus its weight) with respect to the electrical drive of the aircraft.

The aircraft can be a transport aircraft, passenger aircraft, light aircraft or a pseudo-satellite (high-altitude pseudo-satellite—HAPS). For example, the aircraft can be powered by electricity which is generated in the fuel cell and the generator, or certain electrical components in the aircraft can be powered by the electricity thus generated. Alternatively or additionally, the aircraft can also comprise an electrolyzer which is cooled by the cooling system. Any weight reduction is hugely important for an aircraft, since less energy is required for propulsion.

It is self-evident that the above-described aspects, configurations, variants and examples can be combined without this having been explicitly described. Each of the described configuration variants and each example are thus to be regarded as optional with regard to each of the aspects, designs, variants and examples or even combinations thereof. The present disclosure is consequently not limited to the individual configurations and configuration variants in the sequence described, or to a particular combination of the aspects and configuration variants.

BRIEF DESCRIPTION OF THE DRAWINGS

Preferred exemplary embodiments of the invention will now be explained in more detail with reference to the appended schematic drawings, in which.

DETAILED DESCRIPTION OF THE PREFERRED EMBODIMENTS

Figure 1:
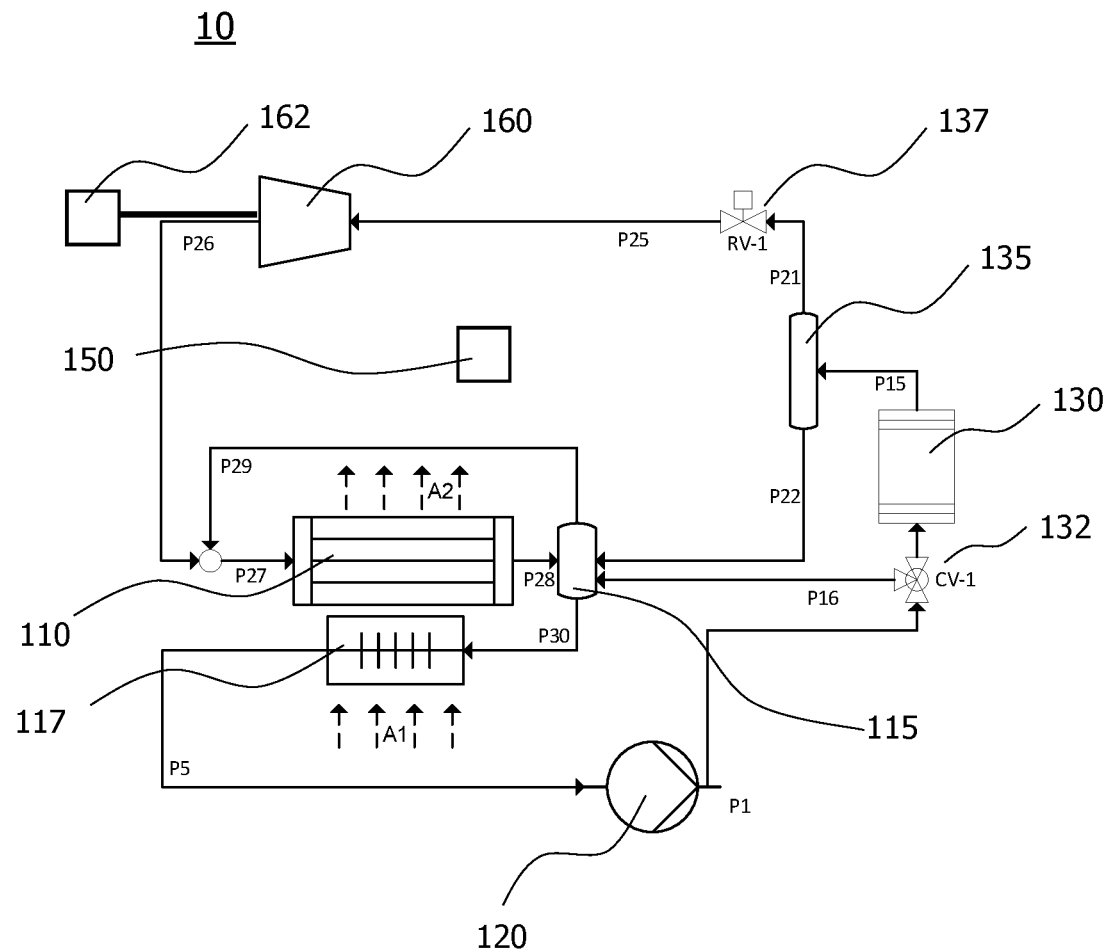
FIG. 1 schematically shows a first variant of a cooling system.

FIG. 1 schematically shows a first variant of a cooling system 10 which comprises a condenser 110, an evaporator 130 and a conveying device 120. The evaporator 130 is, for example, connected to the conveying device 120 via a supply line P1, so that a refrigerant of the cooling system 10 can be conducted from the conveying device 120 into the evaporator 130. In the evaporator 130, the refrigerant, which is a two-phase refrigerant, can absorb heat energy and, as a result, at least some of the refrigerant vaporizes. In the further course of the cooling system 10, which will be described in more detail, the refrigerant flows to the condenser 110, in which it is cooled and condensed and is subsequently resupplied to the conveying device 120 in a liquid state. For this purpose, the condenser 110 can be thermally coupled to a heat sink A2, for example in the form of a cold fluid stream (outside air in the case of a vehicle).

In the variant depicted, the evaporator 130 is integrated in a heat source 130 (fuel cell and/or electrolyzer). In other words, the heat source 130 has sections, through which the liquid refrigerant flows and vaporizes therein, at least in part, thereby acting as an evaporator. In this connection, the enthalpy of vaporization is especially used for cooling the heat source 130.

Downstream of the evaporator 130 (or integrated therein or connected thereto) is a first collection vessel 135 which is configured for collection and separation of the liquid and gaseous refrigerant from the evaporator 130. For example, the first collection vessel 135 can be fluidically connected to an outlet of the evaporator 130 via a line P15.

The cooling system 10 has a first discharge line P21 which fluidically connects the first collection vessel 135 to a part of the cooling system 10 upstream of the condenser 110. As a result, gaseous refrigerant can be discharged from the first collection vessel 135 and be conducted into the condenser 110 for condensation. In the first discharge line P21, there can be arranged a first regulating valve 137 which is configured to regulate a flow rate of the gaseous refrigerant through the first discharge line P21. In this connection, the first discharge line is formed by the line sections P21 and P25. By means of the first regulating valve 137, it is possible, firstly, to set/achieve a pressure drop of the gaseous refrigerant in the line P25 for superheating of the gaseous refrigerant and, secondly, to control pressure in the first collection vessel 135.

Alternatively, a section of the first discharge line, for example the line section P21 directly after the first collection vessel 135, can have a fixed flow resistance. In this connection, the fixed flow resistance can be adapted to the entire system in order to build up a higher pressure in the first collection vessel 135 than in the line section P25 and also in the part of the cooling system 10 downstream of the condenser 110. As a result, the first regulating valve 137 can be dispensed with.

Furthermore, the cooling system 10 has a second discharge line P22 which fluidically connects the first collection vessel 135 to a part of the cooling system 10 downstream of the condenser 110. By means of the second discharge line P22, liquid refrigerant can be discharged from the first collection vessel 135 and be resupplied to the cooling system in a region which guides liquid refrigerant, i.e., downstream of the condenser 110. From there, it can be resupplied to the conveying device 120, for example via the lines P30 and P5. The liquid refrigerant in the second discharge line P22 can be brought about solely on the basis of a pressure difference between the first collection vessel 135 and the section of the cooling system 10 downstream of the condenser 110. An additional conveying device is not necessary. Optionally, a further regulating valve 139 (FIG. 3) can be integrated in the second discharge line P22 in order, for example, to build up the pressure difference (the higher pressure in the first collection vessel 135) and/or a fill level of liquid refrigerant in the evaporator 130 more rapidly.

FIG. 1 shows, moreover, an expander 160 which is fluidically connected to the evaporator 130 downstream of the evaporator 130. For example, the expander 160 can be arranged in the first discharge line P21, preferably in the section P25 of the first discharge line downstream of the first regulating valve 137, and expand gaseous refrigerant from the evaporator 130. For example, the expander 160 can be implemented in the form of an (expansion) turbine, a multistage turbine, a Wankel engine or a piston engine. A droplet-resistant expander 160 is preferred, since refrigerant droplets in the gaseous refrigerant cannot be ruled out in all operating phases of the cooling system 10. However, a simpler, and hence lighter, structure of the expander 160 is advantageous for an aircraft.

The expander 160 converts the energy of the gaseous refrigerant upon expansion into mechanical energy, for example into a rotating movement. The mechanical energy can be used to drive a generator 162 and, as a result, it generates electricity. For example, the expander 160 and the generator 162 can be arranged on a common shaft, as is schematically depicted in FIG. 1. The mechanical energy which can be obtained by the expander 160 depends, firstly, on the pressure difference between first collection vessel 135 and inlet side of the condenser 110 and, secondly, on a possible flow rate of the gaseous refrigerant in the first discharge line P21, P25.

Lastly, the cooling system according to FIG. 1 comprises a second collection vessel 115 which is configured to collect the liquid refrigerant from the condenser 110. In this connection, the second discharge line P22 can fluidically connect the first collection vessel 135 to the second collection vessel 115. The second collection vessel 115 can also be integrated in the condenser 110 or be a (widened) section of a refrigerant line P28, P30 downstream of the condenser 110.

If gaseous refrigerant accumulates in the second collection vessel 115, the second collection vessel 115 can be fluidically connected to an inlet side of the condenser 110 via a return line P29. For example, the return line P29 can open into a line section P27 of the cooling system upstream of the condenser 110. In order to avoid a bypass of the condenser 110, a check valve can be provided at the end of the return line P29.

In order to prevent gaseous refrigerant from getting into the conveying device 120, a supercooler 117 can be provided in a section of the cooling system between condenser 110 and conveying device 120, for example between second collection vessel 115 and conveying device 120. The supercooler 117 can have its own heat sink A1 (air stream or other cold fluid) and not that of the condenser 110. Alternatively, the supercooler 117 and the condenser 110 can share a heat sink (not depicted) and/or the supercooler 117 and the condenser 110 form a unit (not shown), i.e., are mutually integrated.

Moreover, FIG. 1 additionally depicts a second regulating valve 132 which is arranged in the supply line P1, P2 and is configured to regulate a flow rate of the refrigerant through the supply line P2. In particular, the second regulating valve 132 can determine the quantity of refrigerant that is supplied to the evaporator 130. As a result, the cooling performance of the evaporator 130 is controlled, and thus also the pressure in the evaporator 130 and in the sections of the cooling system 10 downstream of the evaporator 130.

Optionally, the second regulating valve 132 can also be a branch of the supply line P1 and conduct at least some of the refrigerant conveyed through the line P1 by the conveying device 120 back into a section of the cooling system 10 downstream of the condenser 110 via a line section P16. For example, the line section P16 can open into the second collection vessel 115. As a result, the conveying device 120 can be operated continuously, whereas the inflow into the evaporator 130 is controlled via the second regulating valve 132.

The cooling system 10 has furthermore a control system 150 (or control unit, controller, processor or computer) which is configured to control the conveying device 120 and especially its delivery rate of liquid refrigerant through the lines P5 and P1. Furthermore, the control system 150 can also determine and control the opening and closing and also a degree of opening of the regulating valves 132, 137. In addition, the control system 150 is configured to regulate the operation of the condenser 110 and/or the supercooler 117, for example by control of the supply of cold fluid as heat sink A1, A2.

Furthermore, the cooling system 10 can have sensors, especially pressure sensors and temperature sensors (not depicted). By means of the sensors, the control system 150 can ascertain the pressure and/or the temperature of the refrigerant at the relevant section of the cooling system 10 and control the conveying device 120 and/or regulating valves 132, 137 and/or heat sinks A1, A2. In this connection, the control system 150 is especially designed to ensure a temperature in the evaporator 130 (in the heat source, the fuel cell and/or the electrolyzer) that is as constant as possible. Moreover, the pressure difference between first collection vessel 135 and second collection vessel 115 can be built up and held by means of the control system 150 and, as a result, efficient operation of the cooling system 10 is made possible in a rapid and lasting manner.

In particular, the control system 150 can bring about superheating of the gaseous refrigerant in the first discharge line P21, P25 with the aid of the first regulating valve 137. Depending on the refrigerant used, a very small pressure drop between line P21 and line P25 can already lead to superheating of the refrigerant. The pressure drop can be very small, for example between 10 and 1000 mbar, for example in the case of refrigerant which is guided in the cooling system within a range between 2 bar and 4 bar. Merely as an example, the refrigerant used can be R1336mzz(Z), which is run between 2.4 bar and 3 bar in the cooling system.

Merely by way of example, the control system 150 can carry out various procedures in order to start the cooling system 10. For example, the second regulating valve 132 can be controlled in such a way that only a connection between line P1 and bypass P16 is present, whereas the first regulating valve 137 is open. Now, the heat sink A2 of the condenser 110 is put into operation in order to allow a temperature and pressure of the refrigerant for operation of the evaporator 130. If sufficient liquid refrigerant is present in the section downstream of the condenser 110, for example in the second collection vessel 115, the control system 150 starts the conveying device 120.

The control system 150 can be configured to determine the cooling demand of the evaporator 130. For example, the control system 150 can be supplied with signals or data which reflect an operating state of the device to be cooled. For example, on the basis of the consumed or generated electricity of a fuel cell or an electrolyzer, it is possible to ascertain how high the cooling demand of the fuel cell or the electrolyzer is. Accordingly, the control system can control the second regulating valve 132 in such a way that the necessary quantity of liquid refrigerant gets into the evaporator 130 from the line P1. As a result of the pressure now rising in the first collection vessel 135, the control system 150 can (at least partially) close the first regulating valve 137 in order to establish the above-described pressure difference between first and second collection vessel 135, 115.

Here, the control system 150 can limit the pressure in the first collection vessel 135 and thus in the evaporator 130 to a maximum. For example, the pressure in a fuel cell or an electrolyzer should be limited to a certain value, 3.5 bar by of example, in order to ensure the reliable operation thereof. By means of the first regulating valve 137, the pressure in the evaporator 130, but also the quantity of liquid refrigerant in the evaporator 130, is controllable. Therefore, optimal operation of the fuel cell or the electrolyzer can be ensured.

The control system 150 can furthermore be configured to calculate (by means of pressure and temperature sensors) or measure (by means of a fill-level sensor) a fill level of liquid refrigerant in the evaporator 130. If a sufficient fill level has been reached, the control system 150 can lessen the degree of opening of the second regulating valve 132 and/or reduce the delivery rate of the conveying device 120. In particular, the control system 150 can now operate the evaporator 130 in a wet vaporization process.

Furthermore, the control system 150 is configured to regulate the operation of the condenser 110 and/or the supercooler 117 in order to provide sufficient liquid refrigerant on the inlet side (upstream) of the conveying device 120. In particular, the heat sink A1 or A2 can be regulated here by the control system 150 in order to condense (liquefy) more or less refrigerant, and to hold it available in the second collection vessel 115, for example.

Lastly, the control system 150 can prevent the line P25 of the cooling system 10, which line guides gaseous refrigerant, from being flooded with liquid refrigerant. For this purpose, the quantity of liquid refrigerant which flows through the supply line P1 can be controlled by closure of the second regulating valve 132 and can, for example, be diverted into the bypass P16.

In a further exemplary case, the control system 150 can also be designed to control the device to be cooled (heat source). This is, for example, necessary if the cooling system 10 cannot achieve sufficient cooling performance in the evaporator 130. In the event of a leakage of the refrigerant from the cooling system 10 or an excessively high temperature of the heat sink A1, A2, it may be necessary to reduce the output of the device to be cooled and the associated heat quantity generated. In particular, the control system 150 is configured to capture the operating parameters of the device to be cooled and of the cooling system 10 and to ascertain in advance whether sufficient cooling of the device to be cooled can be achieved or whether the output (heat generation) of the device to be cooled must be reduced. Here, the control system 150 can take into account the maximum permissible pressure in the evaporator 130 and also minimum fill levels in the first and/or second collection vessel 135, 115 and in the evaporator 130.

It is self-evident that the control system 150 can also switch off the device to be cooled and the entire cooling system 10 in order to avoid damage to the device to be cooled and/or the cooling system 10. Here, the control system 150 can be configured to open the first regulating valve 137 in order to supply as much gaseous refrigerant as possible to the condenser 110. As a result, sufficient liquid refrigerant can be held available, for example in the second collection vessel 115, for later renewed starting of the cooling system.

If the refrigerant downstream of the conveying device 120 is too cold to be conducted into the evaporator 130 (e.g., the operation of a fuel cell or an electrolyzer may be hindered or stopped in the event of excessively strong cooling), the refrigerant in the line P1 can be heated. In the simplest case, a separate heater (not depicted) can be provided in order to provide the optimal temperature of the refrigerant for the evaporator 130.

In any case, the control system 150 is configured to conduct gaseous refrigerant, via the first regulating valve 137, through the first discharge line P25 to the expander 160 if, for example, a sufficient pressure difference is present between first and second collection vessel 135, 115. The greater the pressure difference, the greater the necessary cooling demand at the condenser 110 in order to liquefy the refrigerant and to reduce the pressure of the refrigerant at the same time. Since the pressure difference largely arises through the vaporization of the refrigerant in the evaporator 130, this energy can be recovered by the expander 160 and generator 162 by means of generation of electricity.

To simplify what is depicted in FIGS. 2 to 6, the generator 162 and the common shaft with the expander 160 is depicted only in FIG. 1.

Figure 2:
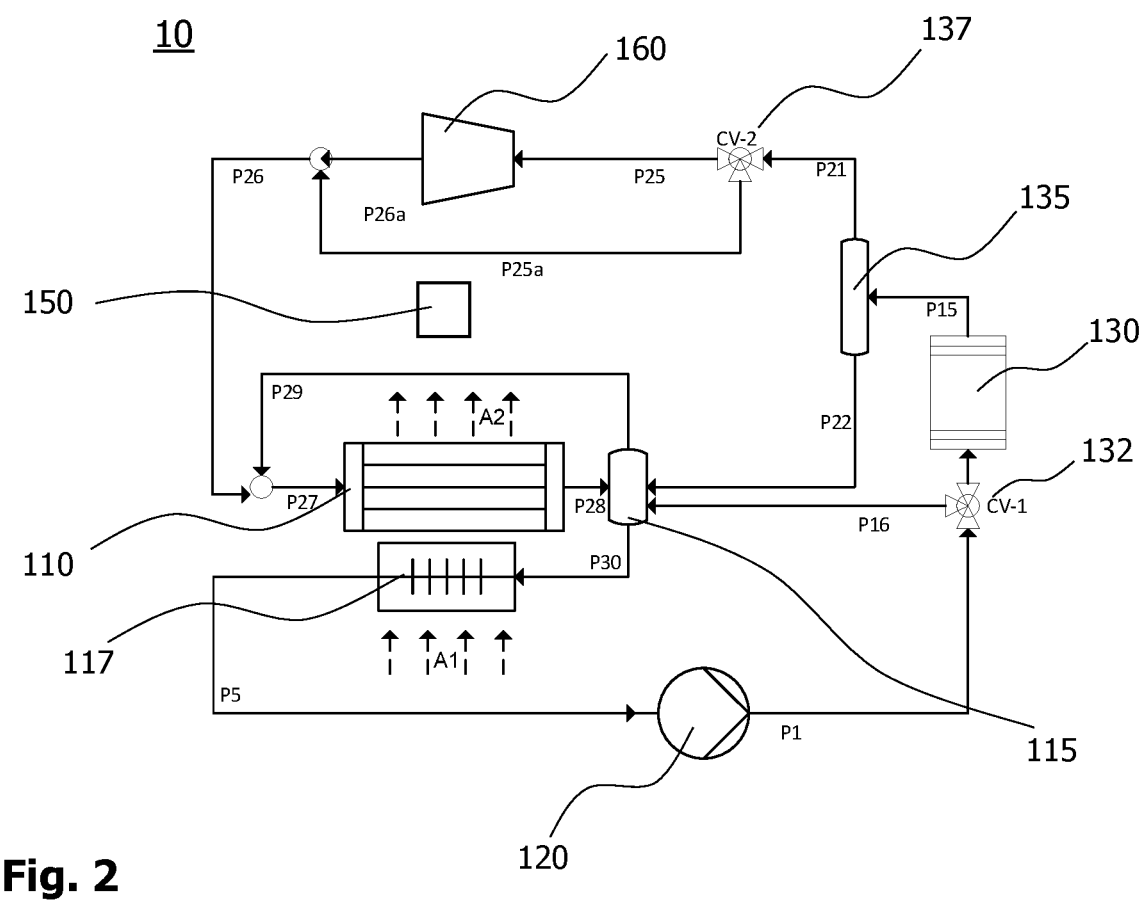
FIG. 2 schematically shows a second variant of a cooling system.

A further variant of a cooling system 10 for a heat source 130 is depicted in FIG. 2. The cooling system 10 shown comprises a multiplicity of components which are also comprised in the cooling system 10 according to FIG. 1, and so the description thereof is not repeated here.

In the cooling system 10 according to FIG. 2, what is shown is a bypass line P25a, through which gaseous refrigerant can be conducted past the expander 160. For example, the first regulating valve 137 can be configured in such a way that it conducts between 0% and 100% of the gaseous refrigerant into the first discharge line P25 toward the expander 160 and conducts the remaining quantity of the gaseous refrigerant (100% to 0%) through the bypass line P25a past the expander 160. As a result, the gaseous refrigerant can, for example, be directly conducted to the condenser 110 during the starting phase of the cooling system 10.

Figure 3:
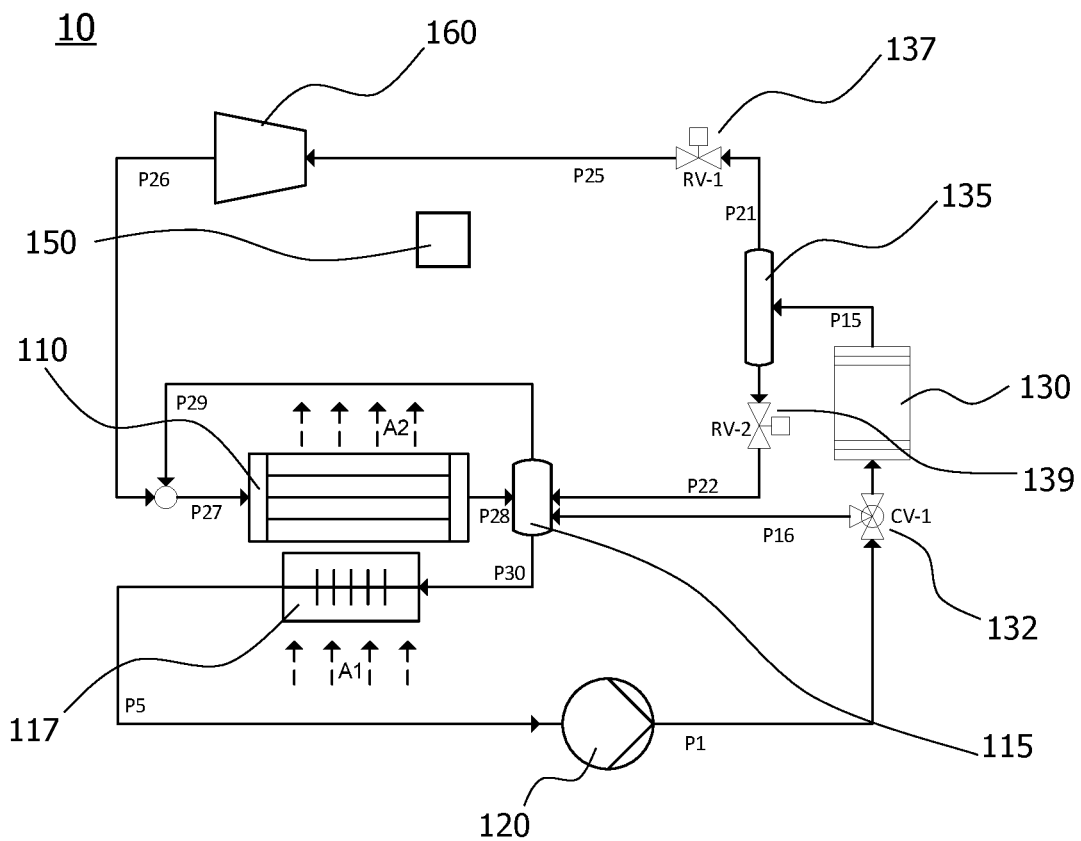
FIG. 3 schematically shows a third variant of a cooling system.

In the variant according to FIG. 3, the cooling system 10 has a further regulating valve 139 which is provided in the second discharge line P22. The cooling system 10 shown comprises a multiplicity of components which are also comprised in the cooling system 10 according to FIGS. 1 and 2, and so the description thereof is not repeated here.

For example, the control system 150 can close the further regulating valve 139 if the pressure in the first collection vessel 135 is (still) insufficiently high for regular operation of the cooling system 10. Equally, the control system 150 can close the further regulating valve 139 if insufficient liquid refrigerant is present in the first collection vessel 135. What is thereby avoided is that gaseous refrigerant gets into the section of the cooling system 10 downstream of the condenser 110 (e.g., into the second collection vessel 115) through the second discharge line P22.

Figure 4:
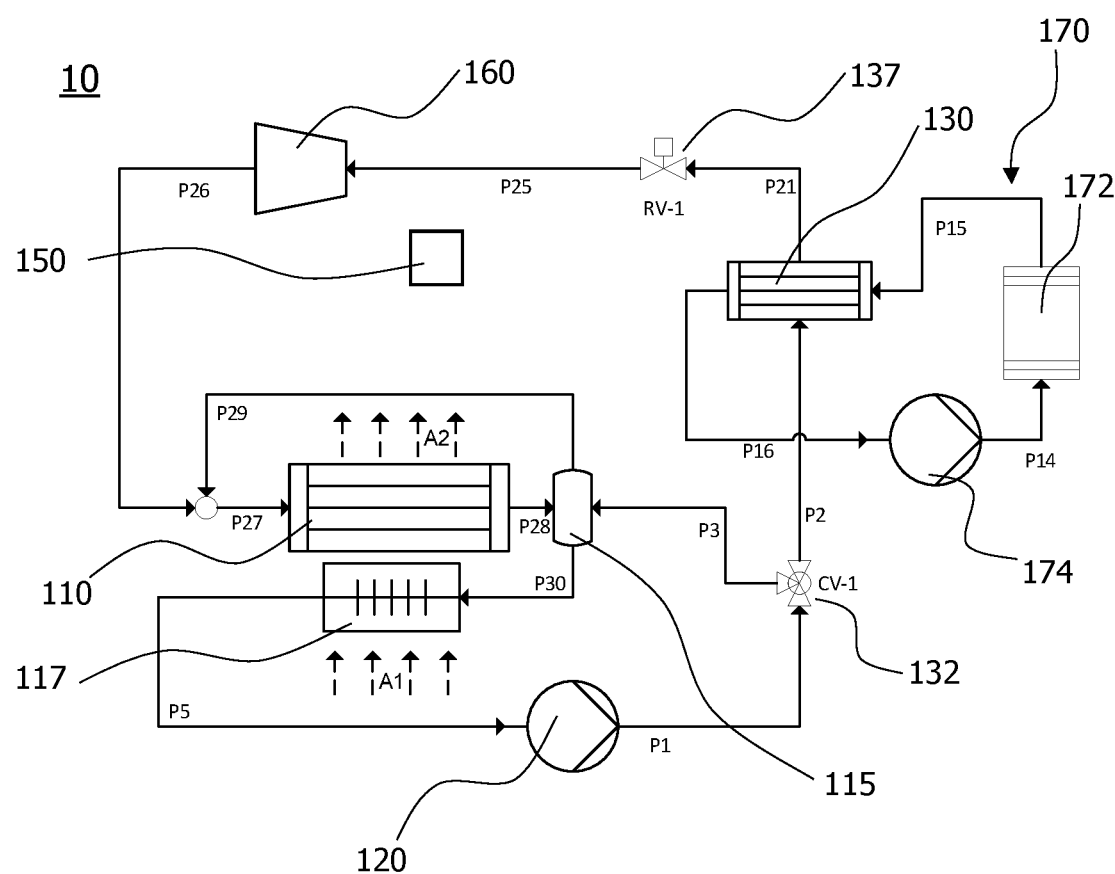
FIG. 4 schematically shows a fourth variant of a cooling system.

FIG. 4 shows a further variant of a cooling system 10 which, however, can be operated not only in a wet vaporization process, but also in a dry vaporization process. The cooling system 10 shown comprises a multiplicity of components which are also comprised in the cooling system 10 according to FIGS. 1 to 3, and so the description thereof is not repeated here.

In contrast to the cooling system variants according to FIGS. 1 to 3, the evaporator 130 is thermally coupled to the heat source 172 in the variant according to FIG. 4. For example, the cooling system 10 has a cooling circuit 170 which thermally couples the heat source 172 to the evaporator 130 via a heat transfer fluid. In this connection, the heat transfer fluid, and the refrigerant used in the cooling system 10, can be different media which have been optimized and/or adapted for the cooling circuit 170 and the cooling system 10, respectively.

For example, the heat transfer fluid in the cooling circuit 170 can be a liquid heat transfer fluid and/or one-phase heat transfer fluid. It brings about a uniform temperature distribution within the heat source 172, since no sections of the heat source 172 are wetted with gaseous heat transfer fluid with possible formation of hotspots as a result.

Furthermore, a refrigerant which completely vaporizes in the evaporator 130 can be used in the cooling system 10. In other words, the cooling system 10 and the evaporator 130 thereof is operated in a dry vaporization process. This is possible because a uniform temperature (even temperature distribution) now need not prevail in the evaporator 130, but only in the heat source 172 with the heat transfer fluid of the cooling circuit 170. The energy from the enthalpy of vaporization, which energy is now increased in the refrigerant of the cooling system 10, can be used for greater conversion into mechanical energy at the expander 160 and thus for higher generation of electricity.

The dry vaporization process furthermore makes it possible to dispense with the first collection vessel 135 and the second discharge line P22 (FIGS. 1 to 3). The cooling system is lighter as a result.

Furthermore, the cooling circuit 170 can comprise a further conveying device 174 which conveys the heat transfer fluid through lines of the cooling circuit 170 and especially from the heat source 172 to the evaporator 130. Alternatively, the heat transfer fluid can also be moved without a conveying device 174 by heating at the heat source 172 and cooling at the evaporator 130.

This variant has furthermore the advantage that the heat source 172 can be arranged at a spatial distance from the cooling system 10 if necessary.

The heat source can likewise be a fuel cell, an electrolyzer, a battery, an electronic component, a motor, a gas turbine or any other heat-generating device.

Figure 5:
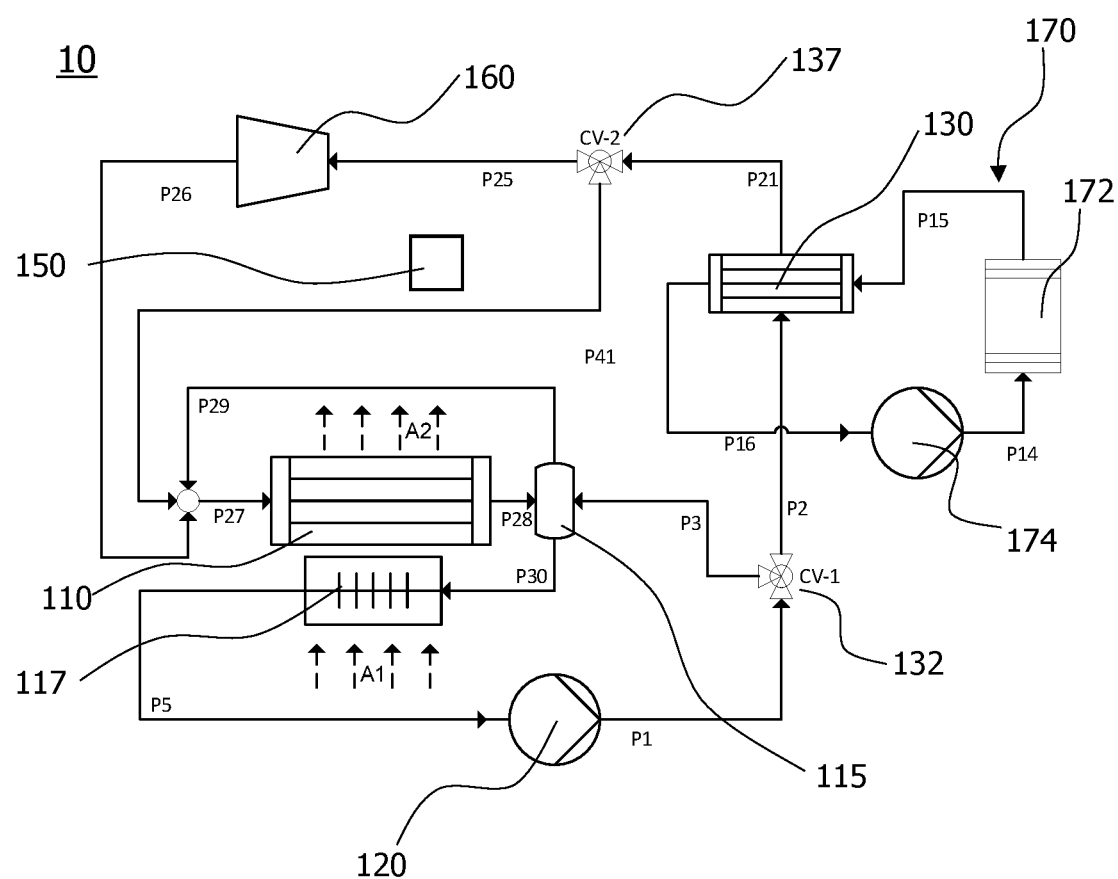
FIG. 5 schematically shows a fifth variant of a cooling system.

In the variant according to FIG. 5, a further bypass line P41 is depicted. The cooling system 10 shown comprises a multiplicity of components which are also comprised in the cooling system 10 according to FIG. 4, and so the description thereof is not repeated here.

In particular, this variant of the cooling system 10, like the variant according to FIG. 2, makes it possible to directly guide gaseous refrigerant from the first regulating valve 137 to the condenser 110 through the bypass line P41. This means that, firstly, the proportion of energy to be recovered that is available to the expander 160 and thus to the generator 162 can be regulated. Secondly, gaseous refrigerant can be re-provided in the evaporator 130 directly via the condenser 110.

Figure 6:
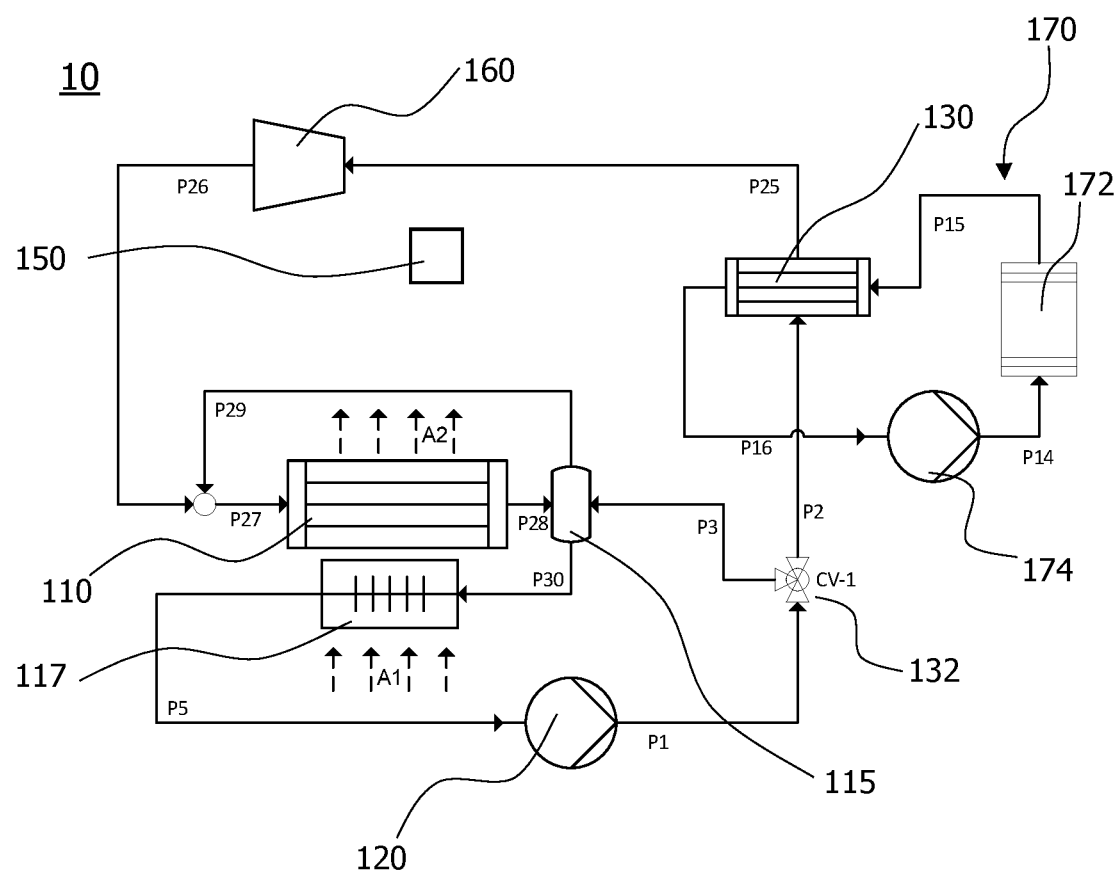
FIG. 6 schematically shows a sixth variant of a cooling system.

According to the variant in FIG. 6, the cooling system 10 can be yet further simplified. Because of the dry vaporization process in the evaporator 130, the first regulating valve 137 can be dispensed with. The control system 150 can, for example, regulate the circuit in the cooling system 10 merely via the supply of liquid refrigerant through the supply line P1, P2 into the evaporator 130, and absorb sufficient heat energy from the cooling circuit 170 at the same time.

Figure 7:
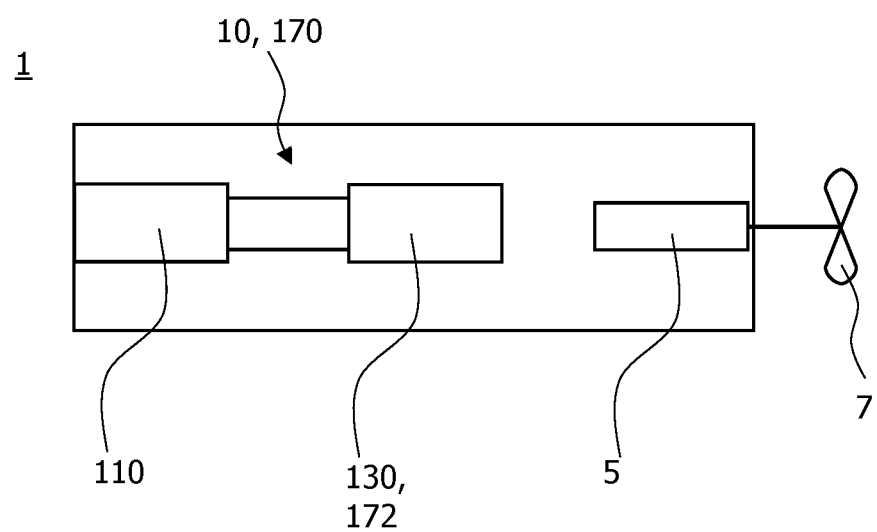
FIG. 7 schematically shows an aircraft.

FIG. 7 schematically shows an aircraft 1 which, for example, has an electrical drive. The electrical drive can, by way of example, be implemented with an electric motor 5 and with a propeller 7 coupled to a motor shaft. It is self-evident that other electrical drive systems can also be provided in the aircraft 1. The aircraft 1 furthermore comprises a cooling system 10, for example a cooling system 10 according to any of FIGS. 1 to 6.

In the aircraft 1, what can be provided is a fuel cell 130, 172 for generation of electricity that, for example, supplies the electric motor 5 with electrical energy. The fuel cell 130, 172 is cooled by a cooling system 10. For example, a cooling system 10 according to any of FIGS. 1 to 3 can be used for cooling of the fuel cell 130. Alternatively, the fuel cell 172 can be part of a cooling circuit 170, as is shown in FIGS. 4 to 6, for example, together with a cooling system 10.

In this connection, the condenser 110 of the cooling system 10 can be arranged in the aircraft 1 in such a way that it is thermally coupled to the surroundings of the aircraft 1 (e.g., air). The ambient air of the aircraft 1 can therefore be used as a heat sink A1 or A2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cooling system containing a two-phase refrigerant, comprising:
a condenser which is configured to cool the two-phase refrigerant and to convert gaseous refrigerant into liquid refrigerant;
an evaporator which is integrated in a heat source or thermally coupled thereto and is configured to heat the two-phase refrigerant, wherein at least some of the refrigerant vaporizes to form gaseous refrigerant;
a conveying device which is configured to convey the two-phase refrigerant from the condenser to the evaporator;
a generator which is configured to generate electricity;
an expander which is fluidically connected to the evaporator downstream of the evaporator and is configured to expand the gaseous refrigerant from the evaporator, to obtain mechanical energy and to drive the generator;
a supply line which fluidically connects the conveying device to the evaporator; and
a regulating valve which is arranged in the supply line and is configured to regulate a flow rate of the refrigerant through the supply line; and,
a control system configured to control the regulating valve in such a way that the evaporator is operated in a wet vaporization process.

2. The cooling system as claimed in claim 1, further comprising:
a fuel cell,
wherein the evaporator is integrated in the fuel cell or thermally coupled to the fuel cell.

3. The cooling system as claimed claim 2, wherein the fuel cell is at least one of a reversible fuel cell or an electrolyzer.

4. The cooling system as claimed in claim 3, wherein the at least one of the fuel cell or the electrolyzer has a section which forms the evaporator.

5. The cooling system as claimed in claim 1, further comprising:
a first collection vessel which is configured to collect liquid and gaseous refrigerant from the evaporator;
a first discharge line which is configured to discharge the gaseous refrigerant from the first collection vessel and which fluidically connects the first collection vessel to the expander; and,
a second regulating valve which is configured to regulate a flow rate of the gaseous refrigerant through the first discharge line,
wherein the control system is configured to control the second regulating valve in such a way that the gaseous refrigerant supplied to the expander is superheated.

6. The cooling system as claimed in claim 5, further comprising:
a second discharge line which fluidically connects the first collection vessel to a part of the cooling system downstream of the condenser and which is configured to discharge liquid refrigerant from the first collection vessel.

7. The cooling system as claimed in claim 5, wherein the control system is furthermore configured to control at least one of the conveying device or the condenser in such a way that a temperature of the refrigerant supplied to the evaporator substantially corresponds to a temperature of the evaporator.

8. The cooling system as claimed in claim 5, further comprising:
a bypass line which is connected to the second regulating valve and is configured to conduct gaseous refrigerant from the first regulating valve to a part of the cooling system downstream of the expander.

9. The cooling system as claimed in claim 1, further comprising:
a cooling circuit which thermally couples the heat source to the evaporator.

10. The cooling system as claimed in claim 9, wherein the cooling circuit comprises a further conveying device which conveys a heat transfer fluid through lines of the cooling circuit.

11. The cooling system as claimed in claim 9, wherein the cooling circuit comprises a further conveying device which conveys a heat transfer fluid through lines of the cooling circuit and from the heat source to the evaporator.

12. An aircraft, comprising:
an electrical drive; and
a cooling system as claimed in claim 2,
wherein the generator driven by the expander and the fuel cell of the cooling system supply the electrical drive with electricity.

13. A cooling system containing a two-phase refrigerant, comprising:
a condenser which is configured to cool the two-phase refrigerant and to convert gaseous refrigerant into liquid refrigerant;
an evaporator which is integrated in a heat source or thermally coupled thereto and is configured to heat the two-phase refrigerant, wherein at least some of the refrigerant vaporizes to form gaseous refrigerant;
a conveying device which is configured to convey the two-phase refrigerant from the condenser to the evaporator;
a generator which is configured to generate electricity;
an expander which is fluidically connected to the evaporator downstream of the evaporator and is configured to expand the gaseous refrigerant from the evaporator, to obtain mechanical energy and to drive the generator; and,
a fuel cell, wherein the evaporator is integrated in the fuel cell or thermally coupled to the fuel cell, wherein the fuel cell is at least one of a reversible fuel cell or an electrolyzer, wherein the at least one of the fuel cell or the electrolyzer has a section which forms the evaporator.

* * * * *